United States Patent [19]

Schröter

[11] Patent Number: 4,866,772

[45] Date of Patent: Sep. 12, 1989

[54] COMMUNICATION SYSTEM

[76] Inventor: Klaus G. Schröter, Höhenweg 1, 1000 Berlin 20, Fed. Rep. of Germany

[21] Appl. No.: 214,834

[22] Filed: Jun. 30, 1988

Related U.S. Application Data

[63] Continuation of Ser. No. 897,338, filed as PCT DE85/00377 on Oct. 16, 1985, published as WO86/03082 on May 22, 1986, abandoned.

[30] Foreign Application Priority Data

Nov. 8, 1984 [DE] Fed. Rep. of Germany ....... 3440796

[51] Int. Cl.$^4$ ............................................. H04L 9/02
[52] U.S. Cl. ......................................... 380/25; 380/9; 380/20
[58] Field of Search .......................... 380/9, 20, 23–25, 380/28, 48; 358/147; 370/85

[56] References Cited

U.S. PATENT DOCUMENTS

| | | | |
|---|---|---|---|
| 4,091,423 | 5/1978 | Branscome | 178/22.17 |
| 4,177,510 | 12/1979 | Appell et al. | 364/200 |
| 4,368,357 | 1/1983 | Gurak | 179/1.5 R |
| 4,386,233 | 5/1983 | Smid et al. | 380/25 |
| 4,438,824 | 3/1984 | Mueller Schloer | 380/25 |
| 4,496,975 | 1/1985 | Noirel | 358/147 |
| 4,536,791 | 8/1985 | Campbell et al. | 358/259 |
| 4,578,530 | 3/1986 | Zeidler | 380/24 |
| 4,718,060 | 1/1988 | Oguchi et al. | 370/85 |

FOREIGN PATENT DOCUMENTS 3217261 11/1983 Fed. Rep. of Germany .

Primary Examiner—Salvatore Cangialosi
Attorney, Agent, or Firm—Collard, Roe & Galgano

[57] ABSTRACT

In a communication system such as the videotext system, the data are prepared according to the so-called ISO layer model before such data are transmitted via a conventional telephone circuit. The fact that telephone circuits may be tapped constitutes a danger in that unauthorized persons may gain access to data relating to individuals.

According to the invention, a selectively connectable coding and decoding module of the bypass-type is provided between the third layer and the active layer of the ISO layer model, said active layer being disposed on top of said third layer. Said module is effectively cut into or connected in the data preparation state at least while the actual message data are being transmitted. In this way, sensitive data can be coded before such data are transmitted via the telephone circuit.

11 Claims, 3 Drawing Sheets

COMMUNICATION SYSTEM

This application is a continuation of application Ser. No. 897,338, filed as PCT DE85/00377 on Oct. 16, 1985, published as WO86/03082 on May 22, 1986, now abandoned.

DESCRIPTION

The invention relates to a communication system such as videotext, teletext etc. with at least one input-/output station and one (or several) external computer, said station and said computer being connected to each other by way of a transmission line for transmitting digitally coded data in both directions, if need be with an interconnected computer exchange station (computer of the postal service), whereby the data are prepared according to the ISO-layer model (reference model according to DIN 7498, 1982 draft), and whereby the digitally coded data comprise data specifically related to the system and user-related data or data relating to individuals, or other sensitive data (message data) requiring protection. Furthermore, the invention relates to a method of transmitting digitally coded data in such a communication system.

Communication systems of the above type and the methods associated therewith are increasingly gaining in importance. An example is the videotext system, which is finding use in a growing number of fields of application.

With the videotext system, it is known that the subscriber—who as auxiliary equipment requires only one accessory unit (the Vtex-decoder) in addition to the conventional television set and telephone (or who may own a complete Vtex-terminal)—may interrogate or query (or input) the desired information via the telephone circuit, and said information is displayed on the screen of the television set.

The available information is prepared by the companies offering such information, or by subscribers, and stored ready for recall in a central postal service computer (referred to as the Vtx-center, too; Vtx = videotext) in the form of so-called videotext pages. The subscriber, by means of his input station, may query, for example the news, scheduled events, merchandise offers by department stores etc. With the videotext system, furthermore, it is feasible also to directly order merchandise or to book a trip, to mention just a few applications.

However, the videotext system offers many other possibilities. For example, in addition to the host or central computer of the postal service, an external computer may be included which, for example, is operated by a bank. This permits the subscriber to the videotext system to communicate with the external computer via the host computer of the postal service, in order to check, for example his bank account balance, or to directly order payments to be made from his account.

In similar ways, health insurance companies or funds and physicians may store patient data in a computer, which permits the patient to obtain information about his data via the videotext system.

The above selection of many application possibilities illustrates the enormous significance of the videotext system. In the light of the many good qualities of said system it is, however, all the more serious that the videotext system continues to be afflicted by an important drawback.

The communication and data traffic take place via the normal telephone circuits made available by the postal service. Thus the data transmission can be compared to a telephone conversation, and this is where said drawback starts to be felt, because telephone circuits can be tapped by unauthorized persons without much technical difficulty. Taking into account that in addition to data that are specifically related to the system, data relating to individuals are transmitted in the videotext system as well, for example when querying the personal bank account, the safety against misuse has to be classified as very low.

In the above case of interrogation of a bank account, some protection against access could be provided by allocating to each account owner a password which is known only to the individual owner. In such a case, the account is accessible to queries only on input of said password. However, the password itself, too, has to be transmitted via the telephone circuit, i.e., it may be "tapped" and misused as well.

Therefore, under the current and important aspects of data protection, the videotext system, which per se is advantageous, has to be classified as unsatisfactory. Thus the use of the videotext system remains basically limited to such "neutral" cases of application in which data linked to individuals are unimportant or only of little significance, for example querying of a weather report, offers of merchandise etc. The possibility of unauthorized tapping of a telephone circuit thus is an obstacle in the way of the desired wide use of the videotext system.

Said obstacle is eliminated by the present invention, which is based on the problem of permitting a safely secured transmission of data in spite of the use of a conventional telephone circuit.

In the communication system of the type specified in the preamble of claim 1, said problem is solved by providing in the course of data preparation a selectively connectable coding and decoding module of the type of a bypass between the third layer and the active layer of the layer model, said active layer being disposed on top of said third layer, which module of the type of a bypass is effectively interconnected in the data preparation process at least while the message data are being transmitted.

The invention is based on the assumption that it will not be possible to change anything about the technical feasibility of unauthorized tapping of a telephone circuit. Therefore, the drawbacks mentioned above are eliminated in another way by making it possible to safeguard data requiring secrecy in a way such that an unauthorized person gaining possession of such data by unauthorized tapping of the telephone circuit cannot interpret the data so accessed. Accordingly, the invention proposes to code to encrypt the data in the course of data preparation based on the standardized ISO-layer model, whereby the coding specification, according to an advantageous design of the invention, is not a constant quantity, but a quantity which is constantly changed in order to make it practically impossible for unauthorized persons to accomplish decoding even though such decoding may be conceivable theoretically speaking.

It is basically known to code messages for the purpose of transmission that is safely secured against tapping, for example on the military sector. However, the invention is not limited to the coding of digitally coded data. In addition to the coding itself, an important feature of the invention is the location where coding is accomplished within the communication system. According to the invention, coding and decoding, too, of the coded data received is provided between the third layer and the active layer of the ISO layer model, said active layer being disposed on top of said third layer. The selected "location of coding" offers special advantages; furthermore, it may be implemented in a technically simple fashion.

Another feature of the invention is that the coding and decoding module of the bypass-type is selectively connectable in the course of data preparation. Thus the user himself can decide in which cases he wishes to safeguard the transmission of data when communicating with a host computer of the postal service, or with an external computer.

Additional advantageous features and useful embodiments of the invention are disclosed in the subclaims and process claims. The invention may be successfully used both in nontransparent and transparent data transmission operations.

The invention is explained in greater detail in the following with the help of the drawing, in which.

Figure 3:
Figure 4:
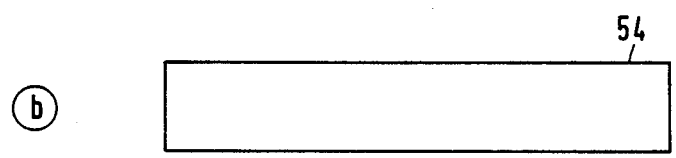
Figure 5:
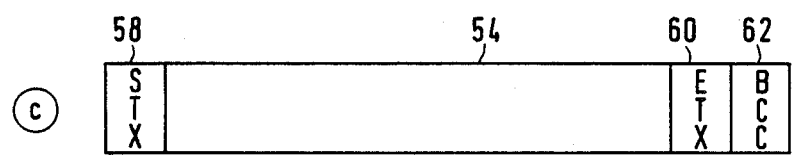
Figure 6:
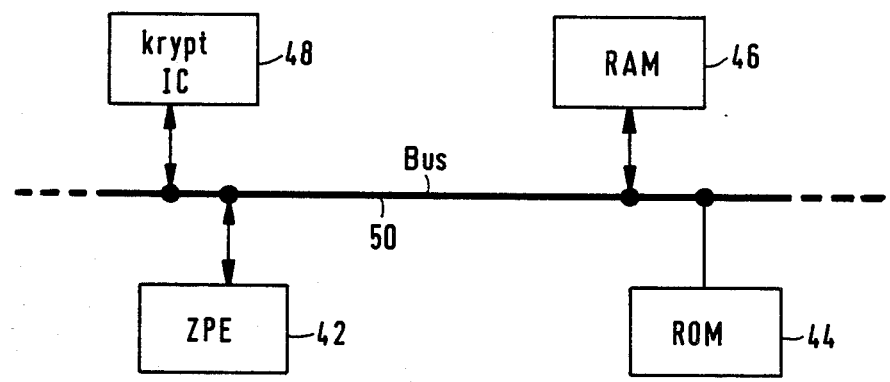

FIG. 3 to FIG. 5 each show a block of messages;

FIG. 6 shows a basic circuit diagram of a coding and decoding module; and

Figure 7:
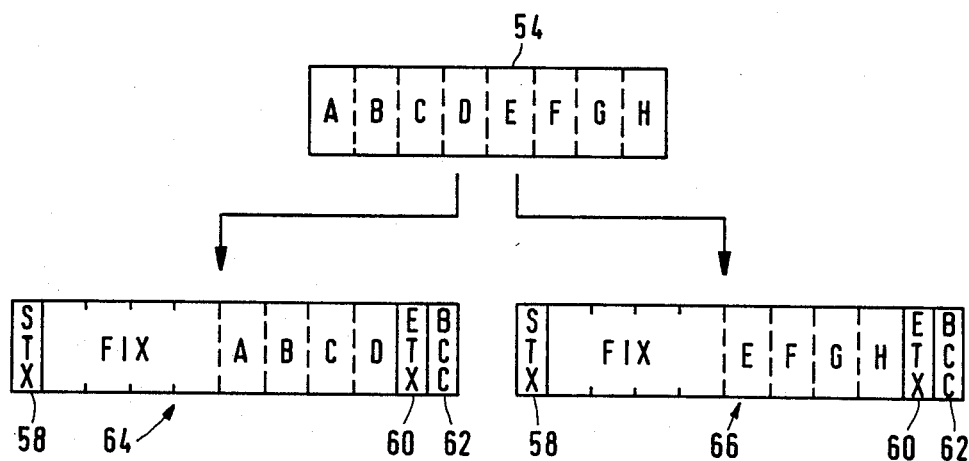

FIG. 7 shows a view explaining the division of a message block into a number of partial message blocks in non-transparent data transmission.

Figure 1:
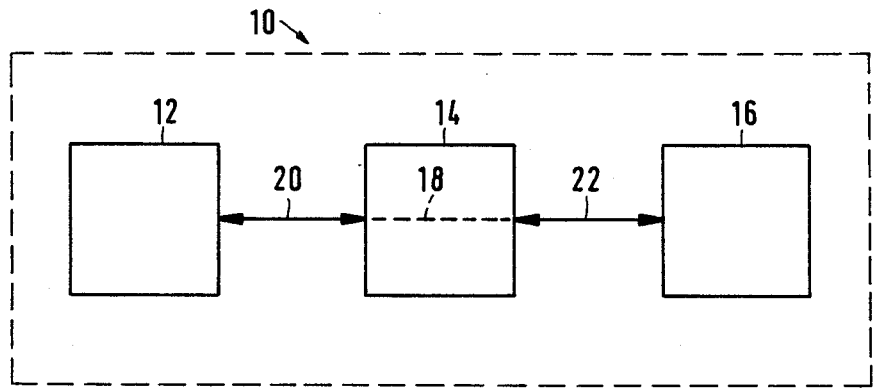
FIG. 1 shows a basic circuit diagram of a videotext system.

The basic pattern of a videotext system 10 is explained with the help of the basic diagram shown in FIG. 1. Said system comprises an input station 12, which is associated with the subscriber to the videotext system and connected to a Vtx-center 14 via a transmission circuit 20.

Normally, the Vtx-center 14 is a host computer operated by the postal service, in which host computer the offers of companies such as department stores, travel agencies etc. are stored in the form of so-called videotext pages, said pages being ready to be recalled. Thus a subscriber to the videotext system is able to query information from the Vtx-center 14 by way of a transmission circuit 20, said circuit being formed by a telephone circuit, and display or reproduce said information on the screen of his television set.

The videotext system 10, furthermore, comprises an external computer 16, which is connected to the Vtx-center 14 by way of a transmission circuit 22. Said external computer 16 may be installed, for example in a bank, which offers its customer the possibility of querying via the videotext system their account balances, or to make payments etc. In such a case, therefore, the communication exists between the input station 12 and the external computer 16; the dashed line 18 indicates that in this case, the transmission line is "looped through" or "looped via" the Vtx-center 14.

In the so-called non-transparent transmission, standard control characters are detected or sensed by the Vtx-center 14 in connection with the message blocks emitted or received, so that the corresponding data are processed within the Vtx-center 14 and the subscriber is able to recall information or videotext pages from the Vtx-center.

The data transfer, of course, may take place in the other direction, too, i.e., in this case, the input station 12 is an output station permitting the "depositing" of information available from the host computer of the postal service. Thus the data may flow in both directions, which is indicated in FIG. 2 in the layer model 30 by the double arrows.

Figure 2:
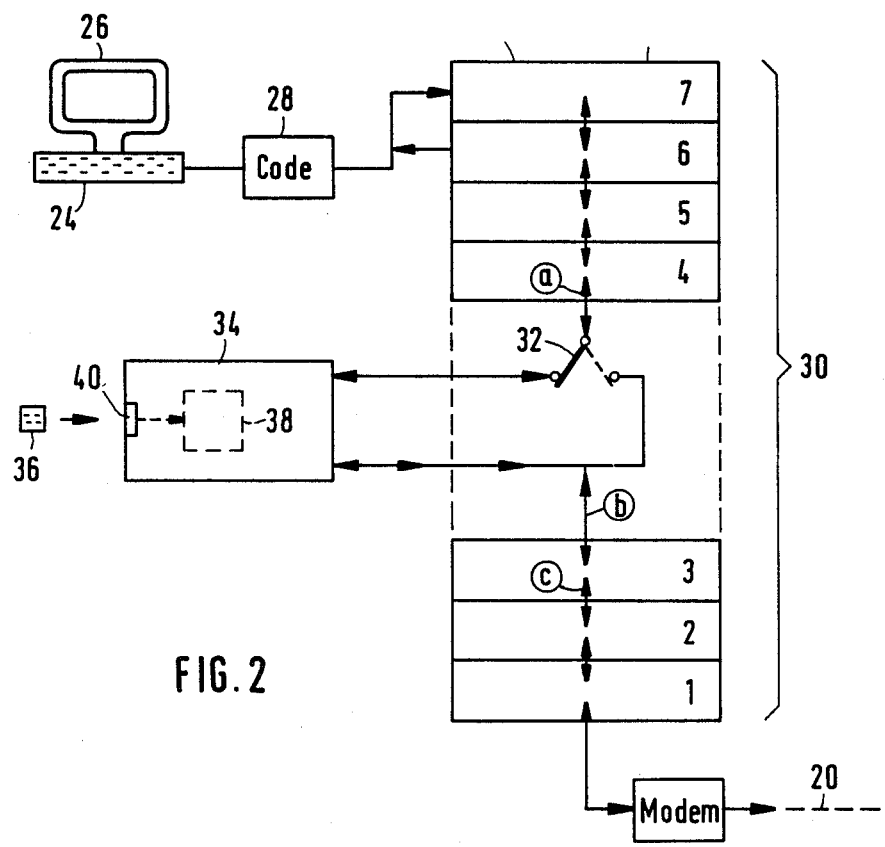
FIG. 2 is a schematic diagram of an input station with coding of the data in the course of data preparation.

The transmission circuits 20 and 22, in the videotext system 10, are formed by conventional telephone circuits; it is known that such telephone circuits may be "tapped" without much difficulty. Therefore, so as to prevent the misuse of data which are related to individuals, which misuse is possible on account of such tapping, said data are coded according to FIG. 2, which is explained in the following:

The input station 10 comprises an input keyboard 24 and a monitor 26, as well as a digital coding 28 (or decoding) followed by the actual data preparation, which in FIG. 2 is indicated by the layer model 30. Said data preparation according to the ISO-layer model is known per se (cf. DIN ISO 7498), so that no detailed explanation is required here.

The drawing according to FIG. 2 shows only the seven layers 7 to 1, which are successively processed. The data preparation stage is followed by a modem 56, from where the data are transmitted to the transmission circuit 20.

Within the data preparation according to layer model 30, a bypass may be selectively interconnected between the third layer "3" and the active layer disposed on top of said layer "3", said bypass being formed by a coding and decoding module 34. The shift switch 32, which is shown symbolically in the figure, indicates that the coding and decoding module 34 is effectively connected during defined periods of time.

In the videotext system, the layers 4 and 5 of the layer model 30 are left out, i.e., in the present system, the coding and decoding module 34 is effective between the third and the sixth layers.

The coding and decoding module 34 may be selectively activated by means of a switch-on device 38. For said purpose, the subscriber has, for example a magnetic card 36 with specific data, and said magnetic card 36 may be inserted in a slot 40 in order to activate the coding and decoding module 34.

Within the course of data preparation according to the layer model 30, message blocks are formed; FIG. 3 shows in a schematic view a message block 52 as produced or generated following processing within the layer "6".

If data relating to individuals are to be transmitted, said data are coded, i.e., according to FIG. 4, a coded message block 54 with coded data is generated on the output of the coding and decoding module 34 while the coding specification is continually changing (compare the location or site marked by "b" within the layer model 30 in FIG. 2).

In the course of further data preparation, the coded message block 54 is supplemented at point "c"(see FIG. 2) by standard control characters (in each case 8-bit words =one byte each) 58 (STX), 60 (ETX) and 62 (BCC).

The standard control characters 58, 60 and 62 have the following meaning: STX =start text; ETX =end text, and BCC =block check character (which is a safeguarding or check character).

The coded data is received at the Vtx-center 14 or by the external computer 16, from where the desired information can be recalled, taking into account corresponding decoding and also coding.

According to FIG. 6, the coding and decoding module 34 has a structure using the known integrated circuit 48 (type AMD 9518) of the type found in computers. Accordingly, a central processor unit 42, a program storage or memory 44 as well as a read-write memory 46 are connected to the bus 50. The coding algorithm is selected in such a way that coding of the data related to individuals is continually changing in order to safely prevent the coding specification from being detected—which is theoretically possible—during unauthorized tapping of the telephone circuit.

At the Vtx-center 14, the videotext pages, which are ready for recall, are stored coded as specified above. In spite of said coding, the host computer of the Vtx-center is capable of receiving the message blocks and to process the data despite said coding. When transmitting the data from the host computer of the Vtx-center to the input station 12 or subscriber, the data are decoded correspondingly, so that the desired information can be displayed on the monitor 26.

In connection with non-transparent data transmission, the coding and decoding module 34 codes not only the data as explained above, but also "chops up" or divides the message blocks, which is schematically shown in FIG. 7:

The message block 54, which is already coded, is divided or "chopped up" in at least two partial message blocks 64 and 66. It is known that one byte comprises 8 bits (in the present case A–H), and the message block is divided in such a way that in the "first part", of the partial message block 64, any data may be arranged in the bit locations with the highest significance, which, in the present case, are characterized by "FIX". The four bits A, B, C and D are disposed in the remaining four locations with the low significance or order.

The partial message block 66 is structured correspondingly; in the present case, the remaining four bits E to H are disposed in the positions of the low order. Thus the coded word has been divided into two halves.

In the videotext system with non-transparent transmission, the host computer of the Vtx-center 14 checks the high-order bits of an incoming byte which, based on the standard, indicate a range of values for control characters; by definition, the first 32 characters are so-called standard control characters. The selected additional data "FIX" are fixed in such a way that no control characters are determined by the Vtx-center among said data, with the result that the total message block is not interpreted as control characters.

In transparent data transmission, the afore-described division or "chopping" is, incidentally, not required; in the present case, coding of the digitally coded data within the message blocks as described herein earlier suffices.

In connection with the distinction between a transparent and non-transparent data transmission it is to be noted that transparent data are data in a message block which are characterized by control characters, which data may comprise the full range of values (e.g. 1 byte corresponding to 8 bits corresponding to 256 values).

Non-transparent data are data within a message block which fall within a limited range of values (e.g. 1 byte corresponding to 8 bits smaller than 256 values).

Concerning the preceding description of FIG. 6 it is to be noted that the program storage 44, the read-write memory 46, the bus 50 and the central processor unit 42 are components of the input station 12 or of an external computer or Vtx-decoder. The actual coding and decoding circuit is formed by the integrated circuit 48.

It has been mentioned earlier herein in the description explaining FIG. 2 that the magnetic card 36 carries specific statements or data. Usefully, said data represent a key—the source key—for the coding and decoding module 34. Thus coding of the data starts with said key. Subsequently, the coding is continually changed with the use of a random number generator (not shown in the drawing).

What is claimed is:

1. A communication system such as video-text, teletext etc., for transmitting message data having at least one input-output station, at least one external computer, and a transmission line, connecting said input-output station to the external computer, a computer exchange station coupled to said transmission line between said external computer and said input-output station, for transmitting digitally coded data in both directions, whereby the data are prepared according to the ISO-layer model, reference model according to DIS 7498, and whereby the digitally coded data comprise data specifically relating to the system and user-related data, or data related to individuals, or other sensitive data for a videotext system, whereby the input station comprises a plurality of ISO data preparation layers, a selectively connectable coding and decoding module to encrypt and decrypt respectively of the bypass-type disposed between the third layer and the active layer of the layer model, said active layer being disposed on top of said third layer, and a switching device disposed within said coding and decoding module for effectively connecting said coding and decoding module to said ISO data preparation layer at least during the transmission of the message data, and wherein the message related data are coded whereas the data specifically relating to the system remains uncoded, and a coded card including the source code for said coding and decoding module and insertable therein for activating said switch-in device.

2. The communication system of claim 1, wherein said coding and decoding module includes a card receiving slot, and said coded card for activating said switch-in device is a magnetic or chip card insertable into a slot in said module.

3. The communication system of claim 1, wherein said coding and decoding module comprises a computer having a central processor unit, a program memory (ROM), a read-write memory (RAM), and an integrated circuit module "AMD 9518".

4. A method for transmitting message-related digitally coded data in a communication system such as videotext, teletext etc., with at least one input-output station and at least one external computer, the station and the computer being connected to each other via a transmission line, and interconnected to a computer exchange station or postal service computer for transmitting the digitally coded data, whereby the data are prepared according to the ISO-layer model (reference model according to DIN ISO 7498), in particular a method of data preparation in the videotext system, comprising the step of:

coding to encrypt the digitally coded data during the course of data preparation, said coding taking place between the third layer and the active layer of said layer model, said active layer being disposed on top of said third layer.

5. The method of claim 4, characterized by the fact that at least the message-related data are coded, whereas the data specifically relating to the system remain uncoded.

6. The method of claim 5, wherein said step of coding is carried out based upon a coding algorithm.

7. The method of claim 6, wherein said coding step comprises the step of continuously changing the coding specification during the course of data preparation and data transmission.

8. The method of claim 7 wherein based upon a non-transparent transmission in which the data are combined into message blocks in the form of bytes (8-bit words) comprising the step of further coding the data within the message block, subsequently dividing the coded message block into at least two partial message blocks, the word lengths of said partial message blocks conforming to the coded message block.

9. The method of claim 8, wherein the 8-bits (A–H) of the coded message block are allocated to the partial message blocks, and that the partial message blocks are filled with additional selected bits (FIX) to 8-bit words.

10. The method of claim 9, wherein within the partial message blocks, the selected bits (FIX) are arranged in the locations of the higher order and the divided bits (A–H) are arranged in the locations of the lower order.

11. The method of claim 10, wherein based upon a transparent transmission, said data are combined into message blocks in the form of bytes (8-bit words), wherein the data within the message blocks are coded.

* * * * *